United States Patent [19]

Shima et al.

[11] 4,267,734

[45] May 19, 1981

[54] TORSIONAL VIBRATION MONITORING APPARATUS FOR ROTATING SHAFT SYSTEM

[76] Inventors: Ichiji Shima, 39-27 , Hukuyo-machi; Tatsuo Yamamoto; Shigeru Yoshibayashi; Hiroshi Teshima, all of c/o The Kansai Electric Power Co., Inc., Technical Research Center of 2, Ichinotsubo 1-chome, Nakoji, Amagasaki City, Hyogo Pref.; Akio Hizume, 8-11, Naka-machi 1-chome, Setagaya-ku, Tokyo; Tetsuo Iki, 1998-5, Yokoo-machi, Nagasaki City, Nagasaki Pref.; Takashi Yamamoto, 347, Motomurago, Tokitsu-cho, Nishisonogi-gun, Nagasaki Pref.; Kyozo Kanamori, 16-10, Shiraiwa-cho, Isahaya City, Nagasaki Pref.; Yoshiaki Mitsuyama, 145-4, Fukohori-machi 1-chome, Nagasaki City, Nagasaki Pref.; Shigeho Tanaka, 39-27 Hokuyo-machi,, Nagasaki Pref., all of Japan

[21] Appl. No.: 74,815

[22] Filed: Sep. 12, 1979

[30] Foreign Application Priority Data

Sep. 22, 1978 [JP] Japan .................. 53/117205

[51] Int. Cl.³ .......................... G01H 1/10; G06G 7/64
[52] U.S. Cl. ....................................... 73/650; 364/801
[58] Field of Search .................. 73/650, 660; 364/550, 364/801; 322/99

[56] References Cited

U.S. PATENT DOCUMENTS

| | | | |
|---|---|---|---|
| 2,420,891 | 5/1947 | McCann et al. | 364/801 |
| 3,093,731 | 6/1963 | Karplus | 364/801 |
| 4,051,427 | 9/1977 | Kilgore et al. | 73/650 X |

*Primary Examiner*—James J. Gill
*Attorney, Agent, or Firm*—Toren, McGeady and Stanger

[57] ABSTRACT

The present invention relates to a torsional vibration monitoring apparatus for a rotating shaft system which is characterized by comprising a detector disposed at a certain position of the rotating shaft system for detecting torsional vibration of the shaft system, a memory device for storing the torsional vibration having a constant time duration which is detected by the detector as a time series data obtained by sampling the torsional vibration with minute unit times, a Fourier transforming device for Fourier-transforming the time series data to obtain a frequency series data, multiplier each for multiplying the frequency series data with a relation which is previously obtained between the vibration of the shaft system at the certain position of the shaft system and that at an arbitrary position thereof at respective frequencies to obtain a frequency series data for the arbitrary position, and reverse Fourier transformer for reverse-Fourier-transforming the frequency series data to obtain a time series data of the torsional vibration of the shaft system at the arbitrary position thereof.

3 Claims, 10 Drawing Figures

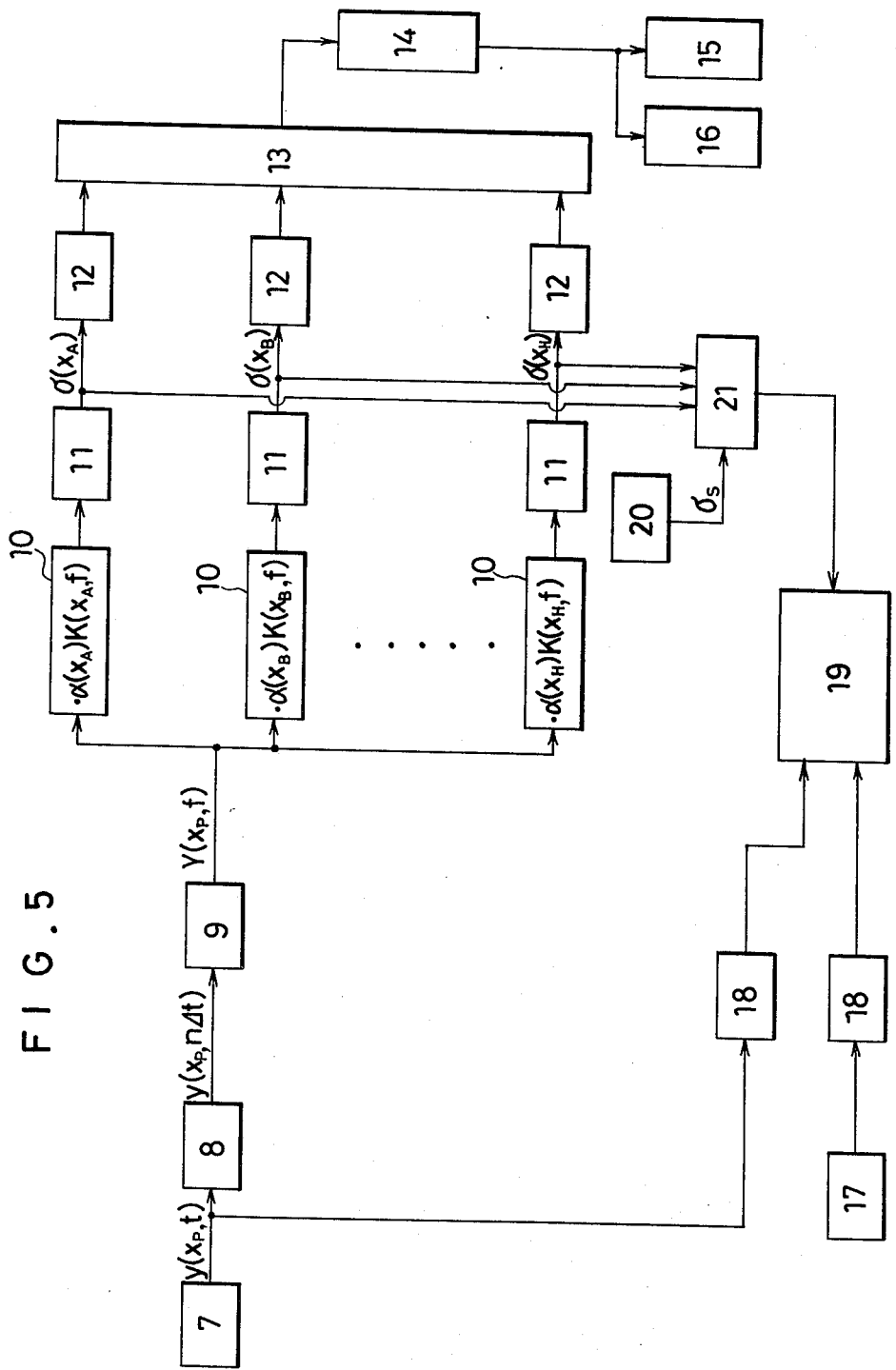

TORSIONAL VIBRATION MONITORING APPARATUS FOR ROTATING SHAFT SYSTEM

BACKGROUND OF THE INVENTION:

1. Field of the Invention

The present invention relates to a torsional vibration monitoring apparatus in which a torsional vibration generated in a rotating shaft system of such as turbine generator is measured at a certain position of the shaft system at which the measurement is possible and a vibration of the shaft system at an arbitrary position thereof is estimated from the vibration measured.

2. Description of the Prior Art

It is very important in designing a rotating shaft system of such as turbine generator, compresser or marine diesel engine to know various disturbances applied thereto. Particularly, it is very important to operators thereof to know the fatigue life of the system which may vary time to time with the disturbances.

It is well known that the rotating shaft system of, for example, the turbine generator is very long and sometimes it becomes several tens meters. Therefore, the number of points at which the rotating shaft system is to be monitored is usually several.

Furthermore the torsional vibration of the rotating shaft system may provide, fatigue damages to the shaft and therefore it is important to measure the vibration. However, a provision of torsional vibration measuring devices at several points along the shaft system is economically disadvantageous and in some cases, it may be physically impossible to locate those measuring devices.

SUMMARY OF THE INVENTION

An object of the present invention is therefore to provide a torsional vibration monitoring apparatus for a rotating shaft system in which a torsional vibration at an arbitrary position of the shaft system can be estimated from torsional vibration measured at a certain position of the shaft system.

In order to achieve the above object, according to the present invention, a torsional vibration monitoring apparatus comprises a detector disposed at a certain position of a rotating shaft system for detecting torsional vibration of the shaft system, a memory device for storing a torsional vibration having a constant time duration which is detected by the detector as a time series data obtained by sampling the torsional vibration with minute unit times, a Fourier-transformer for Fourier-transforming the time series data to obtain a frequency series data, a multiplier for multiplying the frequency series data with a relation which is previously obtained between the vibration of the shaft system at the certain position of the shaft system and that at an arbitrary position thereof at respective frequencies to obtain a frequency series data for the arbitrary position, and a reverse Fourier transformer for reverse Fourier transforming the frequency series data to obtain a time series data of the torsional vibration of the shaft system at the arbitrary position thereof.

Other objects and features of the present invention will be fully understood by those skilled in the art from the following description with reference to the attached drawings.

BRIEF DESCRIPTION OF THE DRAWING:

FIG. 5 is a block diagram of an embodiment of the present invention.

Figure 4:
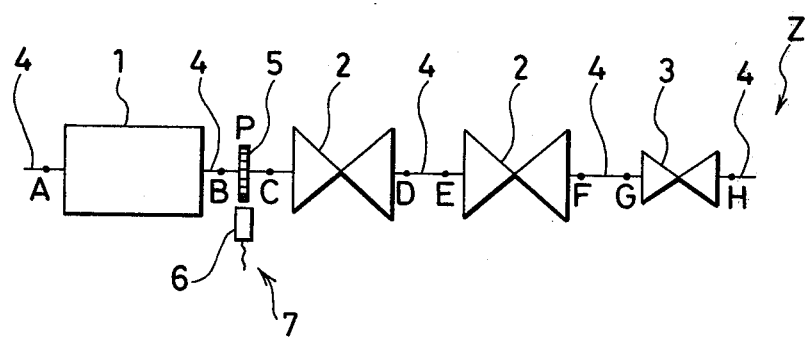
FIG. 4 is an embodiment of the present invention when applied to a turbine generator.

DESCRIPTION OF THE PREFERRED EMBODIMENT:

Referring to FIG. 4, 1 is a generator and 2 and 3 are a low pressure turbine and a high pressure turbine for driving the generator 1, respectively. Reference numeral 4 is rotating shafts connecting the turbines 2 and 3 and the shafts 4 are arranged in series and constitute a rotating shaft system Z. Reference numeral 5 is a turning gear mounted on a certain position P (coordinate $x_p$) of the shaft 4 and numeral 6 shows a pick-up related to the turning gear 5 for detecting the torsional vibration of the shaft 4, the pick-up 6 and the turning gear 5 constituting a detector means 7.

The certain position P is not limited to that shown in FIG. 4, but may be set at any position on the shafts 4. Further, in order to improve the preciseness and reliability of the torsional vibration measurement, the number of the certain position P may be made several.

Positions A through H on the rotating shafts 4 in FIG. 4 represent arbitrary positions at which the torsional vibrations are to be monitored and whose coordinates are $x_A$ through $x_H$ (generalized as $x_j$), respectively.

Referring to FIG. 5, numeral 8 is a memory device which functions to sample a torsional vibration detected by the detector 7 for a constant time period with minute sampling times $\Delta t$ to obtain N time series data $$y(x_p, n.\Delta t) \quad (n=0, \ldots, N-1)$$

and to store them. The minute time unit $\Delta t$ is in the order of 1/1000 second and N is in the order of 1000–2000.

Numeral 9 shows a Fourier transformer which transforms the time series data from the memory device 8 into frequency series data $Y(x_p, f)$ composed of N/2 data represented by an equation (3) to be described later.

Figure 2:
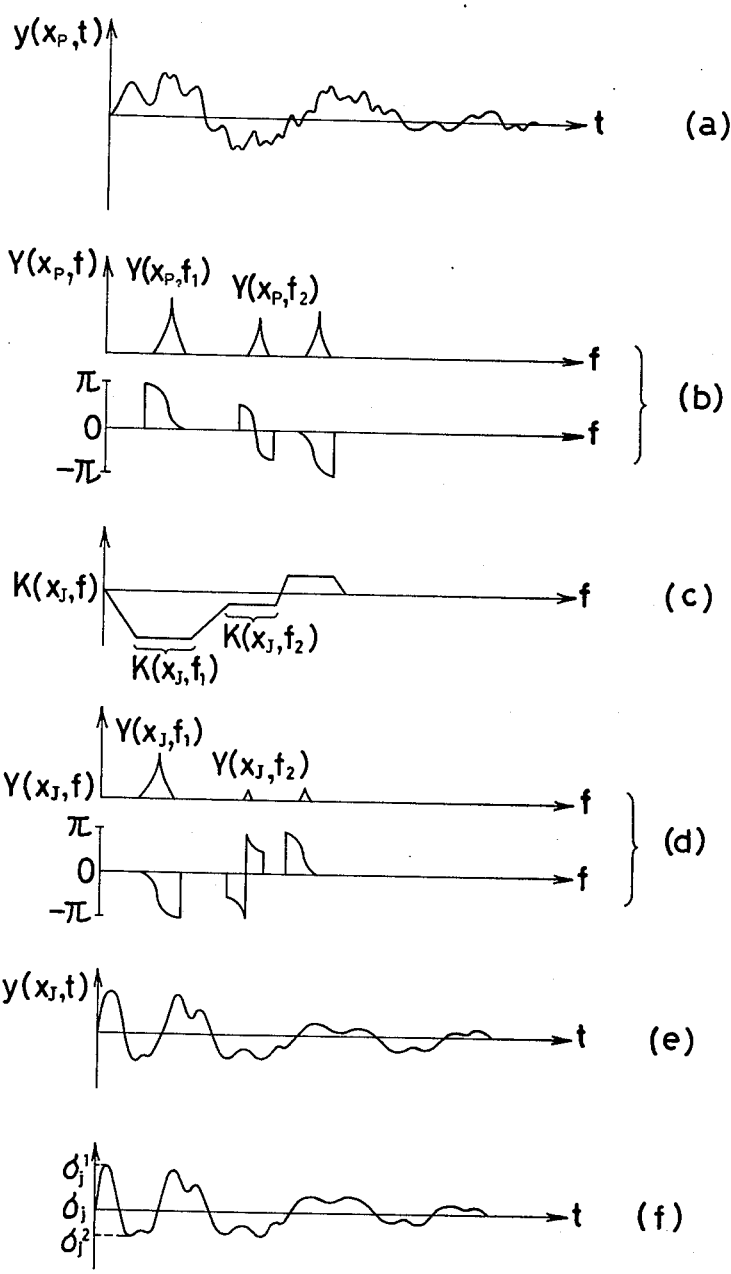
FIGS. 2a to 2f shows waveforms of various torsional vibrations existing in the rotating shaft system, respectively.

Numeral 10 show multipliers each of which functions to multiply the frequency series data $Y(x_p, f)$ with a relation $K(x_j, f)$ in vibration between the certain point P and an arbitrary position $J(J=A \ldots H)$ and a proportion constant $\alpha_j$ for the position J and numeral 11 show reverse-Fourier transformers each of which functions to reverse Fourier-transform the result obtained by the multiplier 10 according to an equation (6) to be described later and to obtain a stress $\sigma_j(x_J, t)$ at the arbitrary position J as shown in FIG. 2(f).

Although the proportion constant $\alpha_j$ is multiplied in the multiplier 10 in this embodiment, it is possible to multiply the proportion constant with the result of the reverse Fourier transformation performed in the reverse Fourier transformer. In the latter case, the result obtained by the reverse Fourier transformer 11 may become a torsional vibration y(x_J, t) at the arbitrary position J.

Numeral 12 show extreme value detectors each for detecting an extreme $\sigma_j^{(k)}$(k=1, 2, ...) of the stress $\sigma_j$ at the arbitrary position J and numeral 13 is a multiplexer for collecting data from the extreme detectors 12 to compute and estimate the fatigue life expenditures represented by equations (8) to (12) to be described later for each of the arbitrary positions A to H, by means of a computer 14.

Numerals 15 and 16 are an indicator and a recorder, respectively, for indicating and recording the fatigue life expenditures at the respective positions A ... H as computed by the computer 14. It is possible to know ends of the lives at the arbitrary position J by confirming on the indicator 15 and the recorder 16 that the fatigue life expenditure $D_j$ of the arbitrary position J becomes 1.

Numeral 17 is an external transient detector for detecting an external force due to an over load such as thunder which affects the rotating shaft system and numeral 18 is a delay circuit for compensating for a time period from a start time of a recorder 19 to a time at which the rotation is stabilized and a normal recording becomes possible. Numeral 20 is a reference voltage generator for generating a voltage corresponding to a set stress value $\sigma_s$ and numeral 21 is a comparator for comparing the set stress value $\sigma_s$ with the stress $\sigma_j$ at the arbitrary position J which is obtained by the reverse Fourier transformer 11 and actuating the recorder 19 when $\sigma_s$ is smaller than $\sigma_j$.

The recorder 19 functions to record the outputs from the external transient detector 17 and the detector 7.

Accordingly, the torsional vibration y(x_p, t) at the certain position P when the stress at the arbitrary position J becomes too large and the external force generated in the rotating shaft system at that time are recorded by the recorder 19.

An operation of the present monitoring apparatus constituted as above will be described hereinafter.

Figure 1:
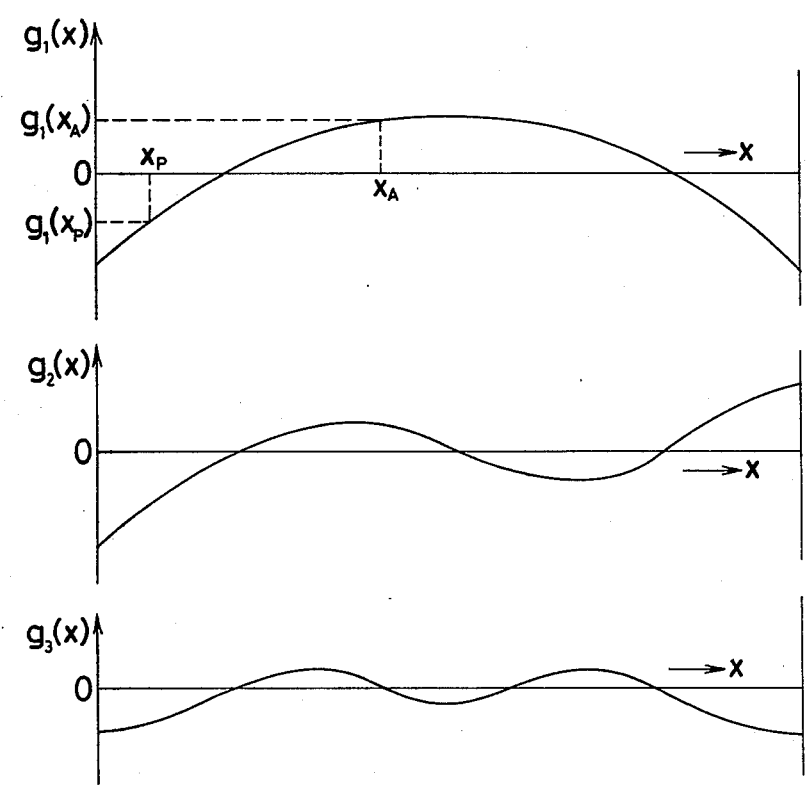
FIG. 1 shows useful graphs to understand torsional vibration mode types of a rotating shaft system.

According to the knowledge from vibratory engineering, the torsional vibration y(x, t) of the rotating shaft system can be represented by a sum of modal vibrations $y_i(x, t)$ and each modal vibration can be represented by vibration modes types. Therefore, the torsional vibration is as follow:

$$y(x,t) = \Sigma y_i(x,t) = \Sigma a_i(t) \cdot g_i(x) \cdot \cos(2\pi f_i t + \epsilon_i) \quad (1)$$

where $f_i$ is ith specific vibration number of the rotating shaft system, $g_i(x)$ is ith vibration mode type of the system (see FIG. 1) and $\epsilon_i$ is phase.

The torsional vibration detected at the certain position P of the rotating shaft system by the detector 7 has a waveform such as, for example, shown in FIG. 2(a). The memory device 8 stores the time series data $$y(x_p, n \cdot \Delta t) = \Sigma a_i(n \cdot \Delta t) \cdot g_i(x_p) \cdot \cos(2\pi f_i \cdot n \cdot \Delta t + \epsilon_i) \quad (2)$$

$$(= 0, 1, ..., N-1)$$

which is composed of digitalized N values obtained by sampling the torsional vibration in the certain time period with sampling time $\Delta t$.

The Fourier transformer 9 transforms the time series data into the frequency series data represented by equation (3) which is as follow:

$$Y(x_p, m \cdot \Delta f) = \sum_{n=0}^{N-1} y(x_p, n \cdot \Delta t) \cdot e^{(-j \cdot 2\pi \cdot m \cdot \Delta f \cdot n \cdot \Delta t)} \quad (3)$$

$$(m = 0, 1, ..., N/2 - 1, j^2 = -1)$$

The frequency series data is shown in FIG. 2(b) and contains informations of amplitude and phase corresponding to various frequencies in the range from 0 to f max $(=2/\Delta t)$ Hz.

On the other hand, the specific vibration number $f_i$ and vibration mode $g_i$ are determined primarily by the rotating shaft system and can be previously calculated.

Therefore, by determining the relation (mode ratio) between vibrations at the arbitrary position J and the certain position P of the rotating shaft system for the respective specific values $f_i$ (see FIG. 2(c)), the vibration spectrum at the arbitrary position J can be estimated by using the mode ratio $K(x_J, m \cdot \Delta f)$ as follow:

$$Y(x_J, m \cdot \Delta f) = Y(x_p, m \cdot \Delta f) \cdot K(x_J, m \cdot \Delta f) \quad (4)$$

(See FIG. 2(d))
This calculation is performed by the multiplier 10. The mode ratio $K(x_J, m \cdot \Delta f)$ is obtained by expanding a value defined by $$K(x_J, f_i) = g_i(x_J)/g_i(x_p) \quad (5)$$

to a suitable frequency band taking account of adjacent specific vibration numbers etc.

Then, by reverse-Fourier-transforming the vibration spectrum at the arbitrary position J as shown in the equation (4) according to $$y(x_J, n \cdot \Delta t) = \sum_{m=0}^{N/2-1} Y(x_J, m \cdot \Delta f) \cdot e^{(j \cdot 2\pi \cdot n \cdot \Delta t \cdot m \cdot \Delta f)} \quad (6)$$

it is possible to estimate the torsional vibration at the arbitrary position (see FIG. 2(e)). This reverse Fourier transformation is performed by the reverse Fourier transformer 11.

According to the present apparatus, the arbitrary position J can be selected freely and, therefore, even if a given position is the place where the torsional vibration detector can not be physically provided, the torsional vibration thereat can be monitored.

In the embodiment shown in FIG. 5, means for estimating the fatigue life expenditure of the arbitrary position J and a recording means for detecting an external force due to an overload such as thunder affecting the rotating shaft system and recording the magnitude of the external force and the torsional vibration at the certain position P at such time as external force generation are provided in addition to the means for estimating the torsional vibration at the arbitrary position J.

The means for detecting and recording the external force is provided for the following reasons. That is, when a huge vibration occurs in the shaft system due to an exertion of a large external force, it may be somewhat difficult to deem it as the sum of the modal vibrations. In such case, the data from the above means can be used effectively in estimation of the torsional vibration and fatigue life expenditure by means of a high precision analysis employing the non-linearity theory and the plastic deformation theory. Further, by recording the type of the external force, the frequency of the occurrence of the force and the type of the vibration due to the force etc., these can be used as materials for maintenance and design of the rotating shaft system.

Now, the method of estimating the fatigue life expenditure will be explained.

The stress due to the torsional vibration of the rotating shaft system is proportional to the amplitude of the vibration. Therefore, designating the proportional constant and the torsional vibration at the arbitrary position J as $\alpha_j$ and $y(x_j,t)$, respectively, the stress at the position J can be represented by $$\sigma_j = \alpha_j \cdot y(x_j,t) \qquad (7)$$

and the reverse Fourier transformer 11 provides the stress $\sigma_j$.

With the stress $\sigma_j$ at the arbitrary position J as above, it is possible to calculate the fatigue life expenditure of the arbitrary position by using the S-N diagram (stress amplitude-fatigue repetition number chart) of material on the basis of the known fatigue life estimation method. In this embodiment the range-pair counting method is employed as the fatigue life estimation method and the followings are based on the range-pair counting method.

Assuming now that the stress at the arbitrary position according to the equation (7) as shown in FIG. 2(f) and designating the extreme values of the equation (7) as $\sigma_j^{(1)}$, $\sigma_j^{(2)}$, with time, the variation amplitude $\Delta\sigma_j^{(k)}$ of the stress waveform from the kth extreme to the (k+1)th extreme and the mean stress $\overline{\sigma}_j^{(k)}$ are represented respectively, as follows:

$$\Delta\sigma_j^{(k)} = \tfrac{1}{2} \cdot |\sigma_j^{(k)} - \sigma_j^{(k+1)}| \qquad (8)$$

$$\overline{\sigma}_j^{(k)} = \tfrac{1}{2} \cdot |\sigma_j^{(k)} + \sigma_j^{(k+1)}| \qquad (9)$$

These extremes are detected by the extreme detectors 7.

The variation stress $\Delta\sigma_{eqj}^{(k)}$ equivalent to the case where the mean stress is zero can be represented by using the modified Goodman chart as follows:

$$\Delta\sigma_{eqj}^{(k)} = \sigma_j^B \cdot \Delta\sigma_j^{(k)} / (\sigma_j^B - \overline{\sigma}_j^{(k)}) \qquad (10)$$

where $\sigma_j^B$ is the tensile strength of the rotating shaft at the arbitrary position j thereof.

Figure 3:
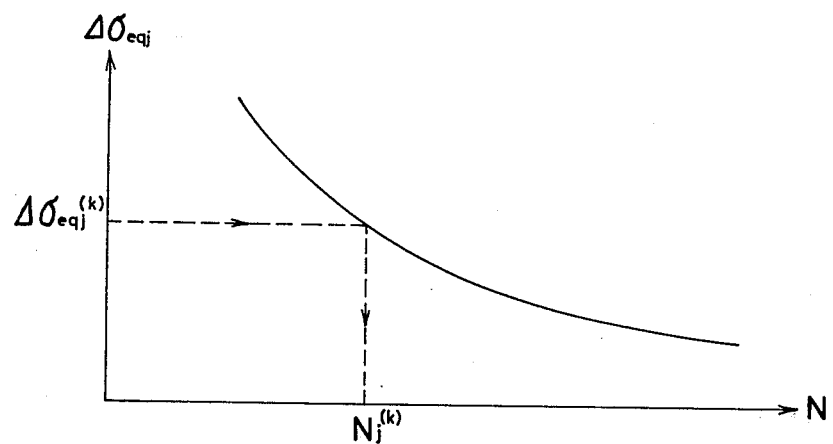
FIG. 3 is an S-N (stress amplitude-fatigue repetition number) diagram.

With the equivalent variation stress $\Delta\sigma_{eqj}^{(k)}$ determined as above, it is possible to obtain the repetition number $N_j^{(k)}$ of the stress $\Delta\sigma_{eqj}^{(k)}$ until the position J is broken from the S-N diagram (See FIG. 3) which shows the relation between the variation stress of the material at the arbitrary position J and the repetition number.

Thus, the life expenditure $\Delta D_j^{(k)}$ due to the variation from the extreme value $\sigma_j^{(k)}$ to $\sigma_j^{(k+1)}$ can be determined as follow:

$$\Delta D_j^{(k)} = 1/(2 \cdot N_j^{(k)}) \qquad (11)$$

Where the stress variation is deemed as a half cycle of the stress wave.

Therefore, it is possible to know the life expenditure of the position J by operating the variation stress at the position J of the rotating shaft system shown by the equation (7), wanting the extreme values of the stress, calculating the life expenditure $\Delta D_j^{(k)}$ according to the equations (8) to (11) and accumulating it. The life expenditure $D_j$ until the stress extreme occurs (n+1) times at the arbitrary position J of the rotating shaft system is represented as follow:

$$D_j = \sum_{k}^{n} \Delta D_j^{(k)} = \sum_{k}^{n} 1/(2 \cdot N_j^{(k)}) \qquad (12)$$

The operation represented by the above equation is performed by the computer 14.

As mentioned hereinbefore, the torsional vibration monitoring apparatus according to the present invention is constituted with the detection of the torsional vibration occurred in the rotating shaft system by means of the detector, the transformation of the vibration into the time series data and the storage thereof by means of the memory and the estimation of the vibration at the arbitrary position of the system by means of the operation of the stored data through the Fourier transformer, the multiplier and the reverse Fourier transformer.

Therefore, there is no need of providing detectors at every position of the system to be monitored. That is, since the torsional vibration at the arbitrary position can be monitored by monitoring the vibration at the certain position, there is no physical limitation of the positions to be monitored.

Further, by providing the extreme value detectors, the multiplexer and the computer to the present apparatus, it is also possible to calculate the fatigue life expenditure of the arbitrary position. In addition, with the provisions of the external force detector, the comparator and the recorder etc., it is possible to record the magnitude of the external force and the actual vibration at the certain position P when a huge vibration occurs in the system due to the external force. The recorded data may be used later for a full analysis thereof using a large computer. In the latter case, there is no need of fully recording the data for a long period of time and therefore the cost for recording can be minimized.

What is claimed is:

1. A torsional vibration monitoring apparatus for a rotating shaft system comprising a detector disposed at a certain position of the rotating shaft system for detecting torsional vibration thereof, a memory device for storing the torsional vibration having a constant time duration which is detected by said detector as a time series data obtained by sampling the torsional vibration with minute sampling time, a Fourier transformer for transforming the time series data into a frequency series data, multipliers each for multiplying the frequency series data with a previously obtained relation between the vibration of the shaft system at said certain position thereof and that at an arbitrary position thereof at respective frequencies to obtain a frequency series data for said arbitrary position and a reverse Fourier transformer for transforming the frequency series data for said arbitrary position to obtain a time series data of the torsional vibration of the shaft system at said arbitrary position thereof.

2. A torsional vibration monitoring apparatus as claimed in claim 1, further comprising a fatigue life calculating means including extreme value detectors for detecting extreme values of stress at said arbitrary position obtained from said reverse Fourier transformer, a multiplexer for collecting the data from said detectors and a computer for computing the fatigue life expenditure of said arbitrary position from output data of said multiplexer.

3. A torsional vibration monitoring apparatus as claimed in claim 1, further comprising an external transient detector for detecting external forces affecting said rotating shaft system, a recorder for recording output signals from said detector and output signal from said vibration detector and a comparator for actuating said recorder when the stress value from said reverse Fourier transformer is larger than a preset stress value.

* * * * *